(12) United States Patent
Hsu

(10) Patent No.: US 10,747,051 B2
(45) Date of Patent: Aug. 18, 2020

(54) INPUT DEVICE AND POINTING UNIT

(71) Applicants: LITE-ON ELECTRONICS (GUANGZHOU) LIMITED, Guangzhou (CN); Lite-On Technology Corporation, Taipei (TW)

(72) Inventor: Kuo-Hui Hsu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/521,593

(22) Filed: Jul. 25, 2019

(65) Prior Publication Data
US 2020/0041840 A1 Feb. 6, 2020

Related U.S. Application Data

(60) Provisional application No. 62/712,993, filed on Aug. 1, 2018.

(30) Foreign Application Priority Data

May 20, 2019 (CN) .......................... 2019 1 0418060

(51) Int. Cl.
| | | |
|---|---|---|
| *F21V 21/00* | (2006.01) | |
| *G02F 1/13357* | (2006.01) | |
| *F21V 8/00* | (2006.01) | |
| *H01H 13/83* | (2006.01) | |
| *G06F 1/16* | (2006.01) | |

(52) U.S. Cl.
CPC ..... *G02F 1/133603* (2013.01); *G02B 6/0036* (2013.01); *G02B 6/0055* (2013.01); *G02B 6/0068* (2013.01); *G02B 6/0073* (2013.01); *G06F 1/169* (2013.01); *H01H 13/83* (2013.01); *H01H 2219/044* (2013.01); *H01H 2219/062* (2013.01); *H01H 2219/064* (2013.01); *H01H 2221/07* (2013.01)

(58) Field of Classification Search
CPC .. G06F 1/169; H01H 13/83; H01H 2219/044; H01H 2219/062; H01H 2219/064; H01H 2221/07; H01H 2219/062
USPC ........... 362/97.4, 23.03, 23.07, 23.16, 23.21, 362/23.22
See application file for complete search history.

(56) References Cited

U.S. PATENT DOCUMENTS

| | | | | |
|---|---|---|---|---|
| 9,176,272 | B2* | 11/2015 | Wang | ..................... G06F 3/0202 |
| 9,230,754 | B2* | 1/2016 | Liang | ..................... H01H 13/83 |
| 10,134,543 | B2* | 11/2018 | Lin | ......................... H01H 13/83 |
| 2014/0118989 | A1* | 5/2014 | Chen | ...................... H01H 13/83 |
| | | | | 362/23.03 |
| 2014/0218890 | A1* | 8/2014 | Wang | ................... G02B 6/0055 |
| | | | | 362/23.03 |

(Continued)

*Primary Examiner* — Laura K Tso
(74) *Attorney, Agent, or Firm* — JCIPRNET

(57) ABSTRACT

An input device and a pointing unit are provided. The input device includes button structures, a light-emitting member, a base plate, and a pointing unit. The light-emitting member is arranged under the button structures. The base plate located between the button structures and the light-emitting member has a body and a first extension portion, wherein the first extension portion extends from the body toward the light-emitting member. The pointing unit is disposed between at least two button structures corresponding to the first extension portion.

16 Claims, 3 Drawing Sheets

(56) References Cited

U.S. PATENT DOCUMENTS

2016/0097896 A1* 4/2016 Liang .................... H01H 13/83
                                                    362/23.03
2016/0109636 A1* 4/2016 Weng ................... H01H 13/023
                                                    362/23.03

* cited by examiner

INPUT DEVICE AND POINTING UNIT

CROSS-REFERENCE TO RELATED APPLICATION

This application claims the priority benefits of U.S. provisional application Ser. No. 62/712,993, filed on Aug. 1, 2018, and China application serial no. 201910418060.8, filed on May 20, 2019. The entirety of each of the above-mentioned patent applications is hereby incorporated by reference herein and made a part of this specification.

BACKGROUND OF THE DISCLOSURE

Field of the Disclosure

The disclosure relates to an input device, and in particular to a keyboard and a pointing unit.

Description of Related Art

With the development of technology, many portable electronic devices have been developed, such as notebook computers or personal digital assistants (PDAs) and so on. Users utilize the keyboard, mouse, and other input devices to communicate with the electronic devices.

However, in an environment where the light is insufficient, the user may have difficulty recognizing the numbers and characters marked on the keys of the keyboard, making the operation difficult. Therefore, an illuminated keyboard has been launched, which can widely applied to the backlight module of various electronic devices and thus applied to the keyboard, thereby solving the input problem caused by insufficient ambient light.

On the other hand, for the purpose of convenience, the illuminated keyboard may also be equipped with pointing component such as a touch pad or a pointing stick, so that the user can control the light cursor to move without an external mouse. However, since the pointing unit is to be set, an opening must be provided at the corresponding position of the component of the illuminated keyboard, which may cause light leakage of the backlight module.

SUMMARY OF THE DISCLOSURE

The present disclosure is related to an input device that can avoid light leakage at a configuration position of a pointing unit.

The disclosure is related to a pointing unit with good leakage preventing effect.

The disclosure is related to an input device with a novel structure.

According to an embodiment of the present disclosure, an input device includes a light-emitting member, a base plate, a thin-film circuit element, a plurality of key caps, and a pointing unit. The light-emitting member has a first opening; the base plate is disposed at one side of the light-emitting member and has a second opening, wherein the base plate includes a body disposed above the light-emitting member and a first extension portion bent from the body toward the light-emitting member, and the first extension portion is formed as a first sidewall of the second opening, and shields a second sidewall of the light-emitting member exposed by the first opening. The base plate is disposed between the thin-film circuit element and the light-emitting member, and the thin-film circuit element is disposed between the key cap and the base plate. The thin-film circuit element has a third opening, wherein the first opening, the second opening and the third opening overlap to form a fourth opening. The pointing unit is disposed at a position corresponding to the fourth opening.

In an embodiment of the present disclosure, the light-emitting member is a backlight module or a luminescent layer.

In an embodiment of the disclosure, the backlight module includes a light-guide film, and the first extension portion arranged between the light-guide film and the pointing unit shields the sidewall of the light-guide film toward the pointing unit.

In an embodiment of the present disclosure, the pointing unit has a support portion and a sensing portion that protrudes upward from the support portion, wherein the sensing portion is in the fourth opening, and the light-emitting member is disposed between the support portion and the base plate.

In an embodiment of the present disclosure, the first extension portion further abuts the pointing unit.

According to an embodiment of the present disclosure, the pointing unit includes a light-emitting member, a base plate, a sensing portion, a support portion, and an operation portion. The light-emitting member has a first opening. The base plate is disposed at one side of the light-emitting member and has a second opening, wherein the base plate includes a body substantially parallel to the light-emitting member, and a first extension portion connected to the body as a first sidewall of the second opening to shield a second sidewall of the light-emitting member exposed by the first opening. The sensing portion is disposed in the first opening and the second opening. The support portion is coupled with the sensing portion, so that the light-emitting member is disposed between the support portion and the base plate. The operation portion is arranged on the sensing portion.

In an embodiment of the present disclosure, the support portion is disposed under the sensing portion at a position corresponding to the first opening and the second opening, and is fixed with the light-emitting member.

In an embodiment of the present disclosure, the first extension portion is disposed between the light-emitting member and the sensing portion.

According to an embodiment of the disclosure, the input device includes a plurality of button structures, a light-emitting member, a base plate and a pointing unit. The light-emitting member is disposed under the button structures, and the base plate is disposed between the button structures and the light-emitting member. The base plate has a body and a first extension portion extending from the body toward the light-emitting member. The pointing unit is disposed between the at least two button structures corresponding to the first extension portion.

In an embodiment of the present disclosure, the light-emitting member has a first opening, the base plate has a second opening, and the first opening, the second opening and the pointing unit are disposed corresponding to each other.

In an embodiment of the present disclosure, the first extension portion extends into the first opening of the light-emitting member.

In an embodiment of the present disclosure, the size of the first opening is greater than the size of the second opening.

In an embodiment of the present disclosure, the length of the first extension portion in a direction extending from the body toward the light-emitting member is greater than or equal to the thickness of the light-emitting member.

In an embodiment of the present disclosure, the button structure includes a plurality of key caps, a thin-film circuit element, a plurality of elastic members, and a plurality of connection components. The key cap is disposed on the base plate, and the thin-film circuit element is disposed between the base plate and the plurality of key caps; the elastic members are respectively disposed between the thin-film circuit element and the plurality of key caps; the connection components are respectively connected to the base plate and the plurality of key caps.

In an embodiment of the present disclosure, the light-emitting member includes a light shielding layer, a reflecting layer, a light-guide film, and a light source, wherein the light-guide film is disposed between the light shielding layer and the reflecting layer, and the light source is disposed at one side of the light-guide film or the opening of the light-guide film, the first extension portion shields the sidewall of the light-guide film adjacent to the pointing unit.

In an embodiment of the present disclosure, the pointing unit includes a support portion, a sensing portion, and an operation portion. The pointing unit is fixed under the light-emitting member through the support portion; the sensing portion is coupled to the support portion and passes through the light-emitting member; the operation portion is arranged on the sensing portion.

In an embodiment of the present disclosure, the input device further includes a barrier layer disposed between the base plate and the support portion, wherein the first extension portion abuts onto the barrier layer.

In an embodiment of the present disclosure, the base plate has a second extension portion, wherein the second extension portion connected to the edge of the body extends opposite to the first extension portion.

Based on the above, in the input device and the pointing unit of the present disclosure, by bending a portion of the base plate to form the first extension portion, the sidewall of the light-emitting member exposed by the opening is shielded, so that light leakage from the sidewall of the light-emitting member can be avoided.

BRIEF DESCRIPTION OF THE DRAWINGS

The accompanying drawings are included to provide a further understanding of the disclosure. The accompanying drawings are incorporated into the specification and constitute a part thereof. The accompanying drawings illustrate embodiments of the disclosure and, together with the description, serve to explain the principle of the disclosure.

DESCRIPTION OF EMBODIMENTS

Figure 1:
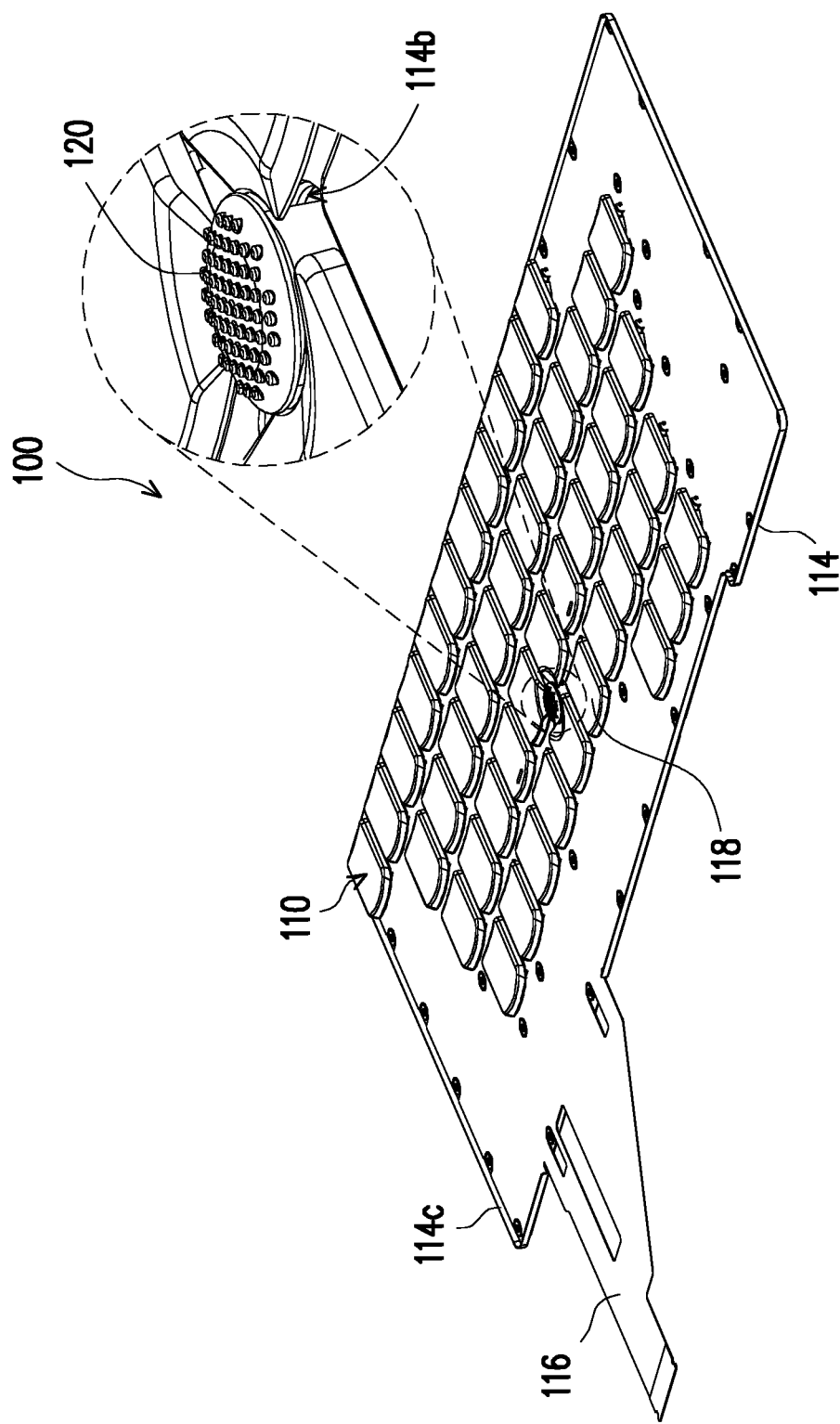
FIG. 1 is a schematic view of an input device according to an embodiment of the present disclosure.

Reference will now be made in detail to the exemplary embodiments of the disclosure. Descriptions of the exemplary embodiments are incorporated in the accompanying drawings. Whenever possible, the same reference symbols are used in the drawings and descriptions to indicate the same or similar parts.

Figure 2:
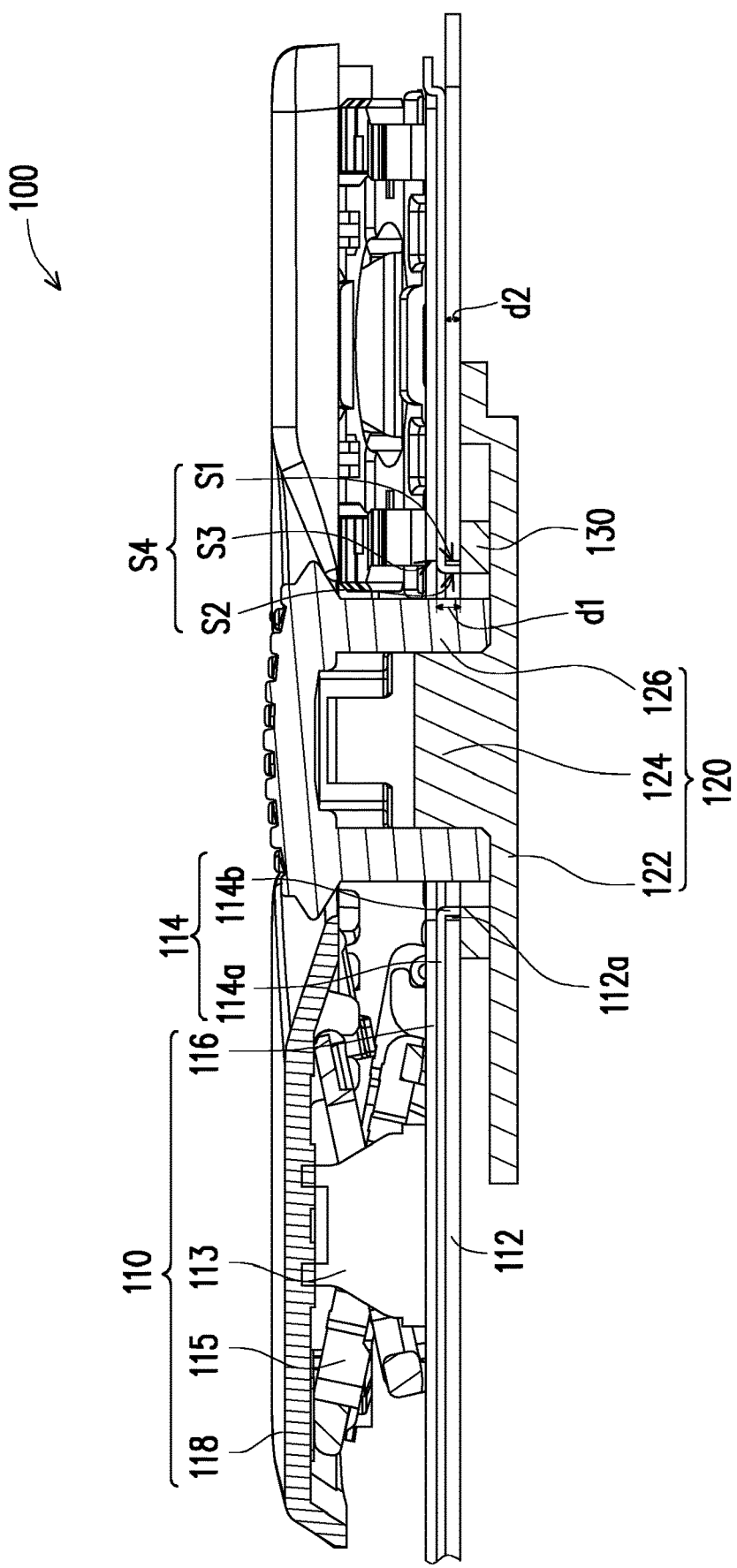
FIG. 2 is a schematic partial cross-sectional view of FIG. 1.
Figure 3:
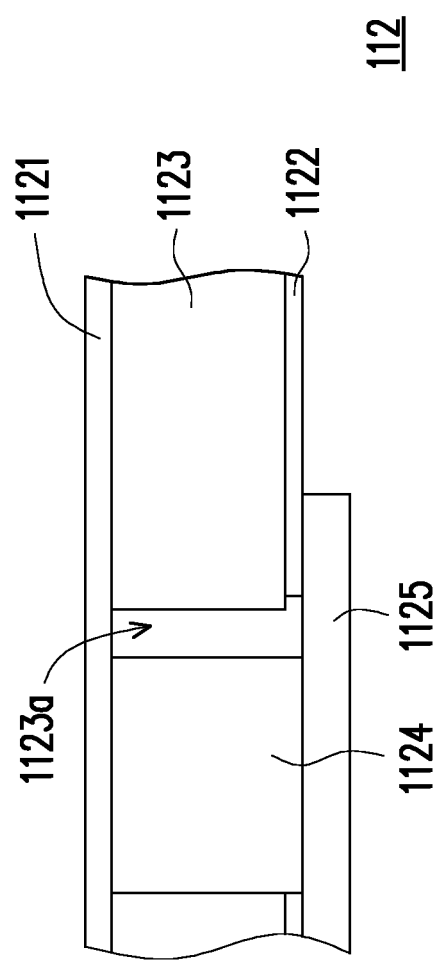
FIG. 3 is a partial enlarged view of a light-emitting member according to an embodiment of the present disclosure.

FIG. 1 is a schematic view of an input device according to an embodiment of the present disclosure. FIG. 2 is a schematic partial cross-sectional view of FIG. 1. FIG. 3 is a partial and enlarged view of a light-emitting member according to an embodiment of the present disclosure. Referring to FIG. 1, FIG. 2 and FIG. 3, an input device 100 of the embodiment is an illuminated keyboard that can be applied to a notebook computer. The input device 100 has a light-emitting member 112, a base plate 114, a plurality of button structures 110, and a pointing unit 120 for users to control or move the cursor easily. The base plate 114 is disposed on the light-emitting member 112, and the button structures 110 are disposed on the base plate 114; that is, the button structures 110 and the light-emitting member 112 are respectively located on two opposite sides of the base plate 114. In an embodiment, the pointing unit 120 can be disposed between at least two button structures 110 and at a position substantially within the central area of the input device 100.

The input device 100 includes the light-emitting member 112, the base plate 114, a thin-film circuit element 116, and a plurality of key caps 118 stacked from the bottom upward. It should be noted that the descriptions regarding orientation or direction are based on the content presented in the drawings and the disclosure, and the descriptions regarding orientation or direction will be changed in accordance with the changed or rotated reference. For example, the button portion of the input device 100 in FIG. 2 includes, from the bottom upwards to the top, the light-emitting member 112, the base plate 114, the thin-film circuit element 116, and the plurality of key caps 118; and when the FIG. 2 is rotated upside down, the input device 100 would include, from the top to the bottom, the light-emitting member 112, the base plate 114, the thin-film circuit element 116, and the plurality of key caps 118.

In addition, the single button structure 110 of the input device 100 includes an elastic member 113 and a connection component 115 both of which are disposed between the thin-film circuit element 116 and the key cap 118. The respective ends of the connection component 115 are movably connected to the base plate 114 and the corresponding key cap 118, thereby supporting the key cap 118 to move up and down with respect to the base plate 114. The connection component 115 is, for example, a scissor-type component including a pair of frames pivotally connected to each other. The elastic member 113 is disposed in a region defined by the connection component 115 and is located within the projection of the key cap 118. The elastic member 113 is, for example, a rubber body, a metal dome or piece, or a spring to provide a restoring force enabling the key cap 118 to restore to the released state.

When the key cap 118 of the input device 100 is pressed, the elastic member 113 is temporarily deformed by the applied force and has a protrusion moved downwards to trigger the switch of the thin-film circuit element 116, thereby enabling thin-film circuit element 116 to generate an input signal. When the force applied to the key cap 118 is removed, the elastic member 113 returns to its original state, and the restoring force thereof drives the key cap 118 to move upwards to the released position.

The light-emitting member 112 can be a backlight module or a luminescent layer, such as a planar sheet with light sources arranged thereon, or an electroluminescence layer (e.g., OLED). In the present embodiment, the light-emitting member 112 of FIG. 3 could be an edge-lit backlighting module that includes a light-shielding layer 1121, a reflecting layer 1122, a light-guide film 1123, and a light source 1124. The light-guide film 1123 is disposed between the light-shielding layer 1121 and the reflecting layer 1122, and the light source 1124 can be a light emitting diode (LED)

placed on one side of the light-guide film 1123 or in the opening 1123*a* of the light-guide film 1123. The light source 1124 could be an SMD-type LED or a chip-scale packaged LED which can be selected according to requirements. In the embodiment shown in FIG. 3, the light-emitting member 112 further includes a circuit board 1125 disposed under the reflecting layer 1122. The circuit board 1125 is, for example, a flexible circuit board and electrically connected to the light source 1124. Once the light emitted from the light source 1124 has entered the light-guide film 1123, the light would be distributed over the interior of the light-guide film 1123 until it is extracted from the light-guide film 1123 and out of the light-emitting member 112, for example, toward the base plate 114. By adding the reflecting layer 1122 underneath the light-guide film 1123, the light that is not totally reflected at the boundary, e.g., the bottom, of the light-guide film 1123 and refracted toward the reflecting layer 1122 can be reflected back inside the light-guide film 1123, thereby minimizing the loss of light and further enhancing uniform luminance over the entire light-emitting member 112. The light-shielding layer 1121 disposed on the light-guide film 1123 has, for example, a translucent or transparent portion and an opaque portion, selectively allowing the light to pass through, such that the light could further pass through openings of the base plate 114 and therefore illuminate the key cap 118 to achieve the back-lighting effect. Meanwhile, certain areas not required to be illuminated, e.g., the gaps between two adjacent key caps 118, could be shaded by the opaque portion to avoid the unwanted light leakage. As depicted in FIG. 2, a first extension portion 114*b* of the base plate 114 that could block the light leakage at the first opening S1 of the light-emitting member 112 is, for example, arranged between the light-guide film 1123 and the pointing unit 120 to prevent the light from travelling out of the sidewall of the light-guide film 1123 toward the pointing unit 120.

The pointing unit 120 of the input device 100 is, for example, configured to pass through the light-emitting member 112 and the base plate 114, and therefore, through holes (e.g., the first opening S1, the second opening S2 and the third opening S3) are required to be formed respectively in the light-emitting member 112, the base plate 114, and the thin-film circuit element 116. Specifically, the light-emitting member 112 has the first opening S1, the base plate 114 has the second opening S2, and the thin-film circuit element 116 has the third opening S3. In an embodiment, the size (diameter) of the first opening S1 is larger than the size (diameter) of the second opening S2, and the first opening S1, the second opening S2 and the third opening S3 are engaged to form the fourth opening S4, wherein the pointing unit 120 is disposed at a position corresponding the fourth opening S4.

Since the pointing unit 120 is disposed in accordance with the position of the first opening S1 and the second opening S2, the base plate 114 in the embodiment is provided with a body 114*a* and the first extension portion 114*b* to solve the problem that the light from the light-emitting member 112 is leaked at the position corresponding to the holes or openings. The body 114*a* is located above the light-emitting member 112, and the first extension portion 114*b* is integrally connected to the body 114*a* and extends downwards. In an embodiment, the body 114*a* may be substantially parallel to the light-emitting member 112, and the first extension portion 114*b* that could be bent from the body 114*a* toward the light-emitting member 112. Thus, the first extension portion 114*b* not only functions as the first sidewall of the second opening S2, but can shield the second sidewall 112*a* of the light-emitting member 112 exposed by the first opening S1 via further extending the first extension portion 114*b* into the first opening S1. The first extension portion 114*b* has the length d1 extending downward, for example, from the body 114*a* toward the light-emitting member 112. In an embodiment, the length d1 may be greater than or equal to the thickness d2 of the light-emitting member 112 to achieve a good light-shielding effect. Additionally, the first extension portion 114*b* may be formed by punching, stamping, and/or bending while processing a sheet metal to form the second opening S2 of the base plate 114.

More specifically, the pointing unit 120 has a support portion 122, a sensing portion 124 coupled to the support portion 122 and protruding upward from the support portion 122, and an operation portion 126 arranged on the sensing portion 124. The sensing portion 124 is disposed in the fourth opening S4, and the light-emitting member 112 is disposed between the support portion 122 and the base plate 114. In addition, the input device 100 includes a barrier layer 130 disposed between the light-emitting member 112 and the support portion 122 of the pointing unit 120, wherein the first extension portion 114*b* abuts onto the barrier layer 130, or in other embodiments that are not shown, the first extension portion 114*b* can further abut onto the support portion 122 to completely shield the second sidewall 112*a* of the light-emitting member 112 adjacent to the sensing portion 124. In this manner, the light leaked from the second sidewall 112*a* of the light-emitting member 112 could be effectively avoided. Moreover, the barrier layer 130 could be an o-ring or an elastic joint, which prevents moisture or liquid from permeating into the interior through a gap between the support portion 122 and the base plate 114, so that the sensing and operation of the button structures 110 or the pointing unit 120 are not impacted.

It should be noted that, in an embodiment, when the pointing unit 120 is assembled to abut the first extension portion 114*b* by upwardly passing through the fourth opening S4 from the lower side of the button structures 110, the light leakage could be effectively mitigated by elongating the first extension portion 114*b* to have the length d1 greater than the thickness d2 of the light-emitting member 112. In this configuration of the pointing unit 120, the support portion 122 is disposed under the light-emitting member 112, the sensing portion 124 passes through the light-emitting member 112 and the base plate 114, and the operation portion 126 is sleeved on the top of the sensing portion 124. The support portion 122, the light-emitting member 112, and the base plate 114 are fixed together by a screw, or the support portion 122 is adhered or attached to the bottom of the light-emitting member 112, such that the pointing unit 120 can be combined with the light-emitting member 112 and the base plate 114.

In other embodiments, the light-emitting member 112, the base plate 114, the support portion 122, the sensing portion 124, and the operation portion 126 can be regarded as a pointing unit without the light leakage, which can be applied to various input devices.

Additionally, the base plate 114, as shown in FIG. 1, further has a second extension portion 114*c* that is connected to the edge of the body 114*a* and extends opposite to the first extension portion 114*b*, so as to minimize light leakage from the peripheral side of the input device 100. In an embodiment, the second extension portion 114*c* could be bent from the body 114*a* and extend upwards along the outer periphery of the body 114*a*, while the first extension portion 114*b* bent from the body 114*a* extends downwards. The second extension portion 114c is formed by, for example, processing the base plate 114 through stamping and/or bending the sheet metal, so that the second extension portion 114c is integrally connected to the outer edge of the body 114a as a flange. When the input device 100 of the present embodiment is applied to a notebook computer, the second extension portion 114c integrally formed with the body 114a can serve as a positioning structure for assembling the input device 100 into the computer. Furthermore, the liquid entering from the button structures 110 into the input device 100 can be blocked from overflowing out of the second extension portion 114c to affect other electronic components under the base plate 114.

In summary, in the input device and the pointing unit of the present disclosure, the first extension portion is formed by bending a portion of the base plate, so as to shield the sidewall of the light-emitting member exposed by the opening, thereby avoiding the problem of light leakage from the sidewall of the light-emitting member at the opening corresponding to the pointing unit.

In addition, the pointing unit is assembled to abut the first extension portion by passing through the opening from the lower side of the input device, which not only discloses a novel configuration structure of the pointing unit and the input device, but also prevents the light leakage more effectively by easily adjusting the length of the first extension portion to be larger than the thickness of the light-emitting member.

Finally, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or replacement do not depart the nature of corresponding technical solutions from the scope of the technical solutions in the embodiments of the present disclosure.

What is claimed is:

1. An input device, comprising:
   a light-emitting member, having a first opening;
   a base plate on one side of the light-emitting member, having a second opening, wherein the base plate comprises a body disposed above the light-emitting member and a first extension portion bent from the body toward the light-emitting member, the first extension portion being a first sidewall of the second opening;
   a thin-film circuit element, having a third opening, wherein the base plate is disposed between the thin-film circuit element and the light-emitting member, and the first opening, the second opening, and the third opening are engaged to form a fourth opening;
   a plurality of key caps, wherein the thin-film circuit element is disposed between the plurality of key caps and the base plate; and
   a pointing unit, disposed at a position corresponding to the fourth opening.

2. The input device according to claim 1, wherein the light-emitting member is a backlight module or a luminescent layer.

3. The input device according to claim 2, wherein the backlight module comprises a light-guide film, and the first extension portion is arranged between the light-guide film and the pointing unit.

4. The input device according to claim 1, wherein the pointing unit has a support portion and a sensing portion protruding upward from the support portion, wherein the sensing portion is disposed in the fourth opening, and the light-emitting member is disposed between the support portion and the base plate.

5. The input device according to claim 1, wherein the first extension portion further abuts the pointing unit.

6. A pointing unit, comprising:
   a light-emitting member, having a first opening;
   a base plate on one side of the light-emitting member, having a second opening, wherein the base plate comprises a body substantially parallel to the light-emitting member and a first extension portion connected to the body as a first sidewall of the second opening to shield a second sidewall of the light-emitting member exposed by the first opening;
   a sensing portion, disposed in the first opening and the second opening;
   a support portion, coupled with the sensing portion, wherein the light-emitting member is disposed between the support portion and the base plate; and
   an operation portion, arranged on the sensing portion.

7. The pointing unit according to claim 6, wherein the support portion is arranged under the sensing portion at a position corresponding to the first opening and the second opening, and is fixed with the light-emitting member.

8. The pointing unit according to claim 6, wherein the first extension portion is disposed between the light-emitting member and the sensing portion.

9. An input device, comprising:
   a plurality of button structures;
   a light-emitting member, disposed under the plurality of button structures;
   a base plate, disposed between the plurality of button structures and the light-emitting member, wherein the base plate has a body and a first extension portion, and the first extension portion extends from the body toward the light-emitting member; and
   a pointing unit, disposed between the at least two button structures corresponding to the first extension portion, wherein the light-emitting member has a first opening, the base plate has a second opening corresponding to the first opening, and a size of the first opening is greater than a size of the second opening.

10. The input device according to claim 9, wherein the first extension portion is disposed in the first opening of the light-emitting member.

11. The input device according to claim 9, wherein a length of the first extension portion in a direction extending from the body toward the light-emitting member is greater than or equal to a thickness of the light-emitting member.

12. The input device according to claim 9, wherein the plurality of button structures comprise:
   a plurality of key caps, disposed on the base plate;
   a thin-film circuit element, disposed between the base plate and the plurality of key caps;
   a plurality of elastic members, respectively disposed between the thin-film circuit element and the plurality of key caps; and
   a plurality of connection components, respectively connecting the base plate and the plurality of key caps.

13. The input device according to claim 9, wherein the light-emitting member comprises:
   a light-shielding layer and a reflecting layer;
   a light-guide film, disposed between the light-shielding layer and the reflecting layer; and a light source, disposed on one side of the light-guide film or in an opening of the light-guide film, wherein first extension portion shields a sidewall of the light-guide film adjacent to the pointing unit.

14. The input device according to claim 9, wherein the pointing unit comprises:
   a support portion, wherein the pointing unit is fixed through the support portion under the light-emitting member;
   a sensing portion, coupled to the support portion and passing through the light-emitting member; and
   an operation portion, arranged on the sensing portion.

15. The input device according to claim 14, further comprising a barrier layer disposed between the base plate and the support portion, wherein the first extension portion abuts on the barrier layer.

16. The input device according to claim 9, wherein the base plate has a second extension portion being connected to an edge of the body and extending opposite to the first extension portion.

\* \* \* \* \*